United States Patent [19]

Phillips

[11] Patent Number: 4,516,270
[45] Date of Patent: May 7, 1985

[54] MICROWAVE RECEIVER FRONT END DESIGN

[75] Inventor: James P. Phillips, Lake in the Hills, Ill.

[73] Assignee: Motorola, Inc., Schaumburg, Ill.

[21] Appl. No.: 471,418

[22] Filed: Mar. 2, 1983

[51] Int. Cl.³ .......................... H04B 1/10; H04B 1/26
[52] U.S. Cl. .................................. 455/302; 455/282; 455/285; 455/311
[58] Field of Search ............... 455/281, 282, 283, 285, 455/286, 287, 291, 293, 302, 311

[56] References Cited

U.S. PATENT DOCUMENTS 1,850,831  3/1932  Elliott ............................... 455/287

OTHER PUBLICATIONS

"LNA Proves New GaAs FET's Low Noise Performance" Microwave Journal, Oct. 1982, pp. 174–176.
"Production Experience and Lower Prices Put GaAs FETs Into Competition" MSN, Oct. 1982, p. 147.
"Broadband Fixture Characterizes Any Packaged Microwave Transistor" by Richard Q. Lane, Roger D. Pollard, Mario A. Maury and James K. Fitzpatrick, Microwave Journal, Oct., 1982.
"Amplifier Application Notes" from Microwave Journal, Oct., 1982.
"A GaAs FET Primer: Understanding These Vital Devices" published in Circle Reader, Oct., 1982 written by R. J. Hamilton, Jr. and Northe K. Osbrink.
"Simultaneous Input Power Match and Noise Optimization Using Feedback" by Jakob Engberg from Proceedings of European Microwave Conference, 1974.
"Stability Considerations of Low-Noise Transistor Amplifiers with Simultaneous Noise and Power Match" by Les Besser Farinon Electric San Carlos, CA.
"Simplify N.F. Calculations of Cascaded Two-Ports" by Fred E. Gardiol published in Microwaves, Apr., 1978.
"Theory of Noisy Fourpoles" by H. Rothe, Ire and W. Dahlke, from Proceedings of the Ire, pp. 811 thru 817.
"Microwave Integrated Circuit Receivers at Millimetric Wavelengths" by T. H. Oxley, K. J. Ming and B. J. Climer, The General Electric Company Limited, Hirst Research Centre, Wembley, England.
"Microwave Transistors" by Robert J. Hamilton, Jr. and Northe K. Osbrink, published in Electronic Engineering Times, Feb. 15, 1982, pp. 68–69.
"Third-Order Intermodulation Distortion and Gain Compression in GaAs FET's by Rodney S. Tucker, member IEEE, IEEE Transactions on Microwave Theory And Techniques, vol. MTT-27, No. 5, May, 1979.
"A 6 GHz Amplifier Using the HFET-1101 GaAs FET" published by Hewlett Packard Components.
"Performance of GaAs MESFET's at Low Temperatures" by Charles A. Liechti and Roderic B. Larrick, publilshed in IEEE Transactions On Microwave Theory And Techniques, Jun. 1976.
"Intermodulation Distortion in Microwave Mesfet Amplifiers" by Ramesh K. Gupta, Colin G. Englefield, Paul A. Goud from Dept. of Electrical Engineering, The University of Alberta, Edmonton, Alberta T6G 2G7 Canada, pp. 405–407.

(List continued on next page.)

*Primary Examiner*—Marc E. Bookbinder
*Attorney, Agent, or Firm*—Donald B. Southard; James W. Gillman; Edward M. Roney

[57] ABSTRACT

The invention is a high frequency hetrodyne receiver front end for receiving a communications signal comprising a desired information frequency and an undesired image frequency. The receiver comprises a bandpass filter, a preamplifier responsive to the bandpass filter, a mixer and a coupler means between the preamplifier and the bandpass filter. The coupler means defines a reactive short at the undesired image frequency due to impedance characteristics of the coupler means. The coupler means thereby eliminates the image frequency noise at the input of the preamplifier. Preferrably the coupler means is a transmission line of a length L where L equals $\eta\pi/\beta$ and $\eta$ is an integer and $\beta$ is proportional to the wavelength of the image frequency.

3 Claims, 2 Drawing Figures

OTHER PUBLICATIONS

"Design of Microwave GaAs MESFET's for Broad-Band Low Noise Amplifiers" by Hatsuaki Fukui published in IEEE Transactions On Microwave Theory And Techniques, vol. MTT-27, No. 7, Jul. 1979, pp. 643-649.

"A Low Noise 4 GHz Transistor Amplifier Using the HXTR-6101 Silicon Bipolar Transistor" by Hewlett Packard.

"RF Small Signal Design Using Two-Port Parameters" by Roy Hejhall Motorola Semiconductor Application Note AN-215A.

"UHF Amplifier Design Using Data Sheet Design Curves" prepared by Applications Engineering for Motorola Semiconductor Application Note AN-419.

"Field Effect Transistors in Theory and Practice" by Applications Engineering, Motorola Semiconductor, Application Note AN-211A.

"Broadband Monolithic MIC Power Amplifier Development" by James E. Degenford, Ronald G. Freitag, Daniel C. Boire and Marvin Cohn for Technical Feature in Microwave Journal, pp. 89-189, Mar., 1982.

MICROWAVE RECEIVER FRONT END DESIGN

BACKGROUND OF THE INVENTION

The invention relates to improved high frequency hetrodyne receivers. More particularly, the invention relates to the use of a GaAs (gallium arsenide) FET as a pre-amplifier in a high frequency receiver. The beneficial use of the special properties of a GaAs FET allows the realization of a receiver front end without a circulator and a notch filter.

Traditionally, the front end of a high frequency receiver, particularly a hetrodyne microwave receiver, required both a circulator and a notch filter. These two devices required custom tuning which complicated production and installation of the receiver front end. In addition, the circulator and notch filter represent an obvious additional expense in comparison to the receiver front end of the invention which requires neither devices.

Therefore, it is an object of the invention to provide a high frequency receiver which does not require a circulator or a notch filter.

It is also an object of the invention to provide a high frequency hetrodyne receiver configuration which allows the preselector filter to provide both a bandpass function and an image frequency notch function when used with a preamplifier before the mixer.

Finally, it is an object of the invention to provide a high frequency hetrodyne receiver of reduced complexity and reduced cost that utilizes a GaAs FET preamplifier.

SUMMARY OF THE INVENTION

The invention is a high frequency hetrodyne receiver front end for receiving a communications signal comprising a desired information frequency and an undesired image frequency. The receiver comprises a bandpass filter, a preamplifier responsive to the bandpass filter, a mixer and a coupler means between the preamplifier and the bandpass filter. The coupler means defines a reactive short at the undesired image frequency due to impedance characteristics of the coupler means. The coupler means thereby eliminates the image frequency noise at the input of the preamplifier. Preferrably the coupler means is a transmission line of a length L where L equals $\eta \pi / \beta$ and $\eta$ is an integer and $\beta$ is proportional to the wavelength of the image frequency.

DETAILED DESCRIPTION OF THE PREFERRED EMBODIMENT

Figure 1:
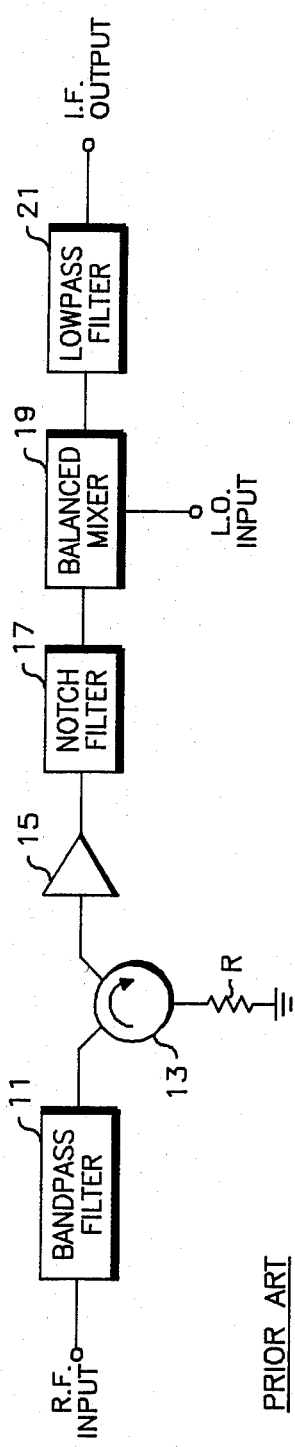
FIG. 1 shows the prior art configuration of a microwave hetrodyne receiver front end.

FIG. 1 is a classic front end design for a microwave hetrodyne receiver. A band pass filter 11 receives the microwave frequency input and passes to its output the desired band of frequencies while rejecting all other frequencies. Of particular concern is the rejection of the image frequency;

$$F_{image} = F_{desired} \pm 2F_{IF}$$

where $F_{IF}$ is the intermediate frequency.

It is necessary to protect the preamp and the mixer in the front end of a receiver from large unwanted signals which can overdrive these circuits and produce intermodulation distortion of the desired signal at the front end output. Also, it is necessary to prevent the image frequency from being simultaneously mixed with the desired frequency down to the intermediate frequency. In microwave applications the bandpass filter 11 is usually fabricated by wave guide resonators or by dielectric resonators. At lower microwave frequencies the bandpass filter 11 is commonly implemented by helical resonators, coaxial stubs, stripline stubs or by other well known means. Proper design of the receiver front end dictates that the signal transferred through the receiver front end filter have minimal loss in the desired band of frequencies and that the reflection loss be maximum for those frequencies that are undesired. The result of such a design is a bandpass filter which has nearly a pure reactive impedance at the image frequency and reflects essentially all the image frequency power.

Microwave signals are usually quite broadband and are degraded by phase nonlinearities caused by a transmission path which contains devices which have mismatched impedance. To prevent such degradation of the signal the output of the bandpass filter 11 is received by a circulator 13. As shown in FIG. 1, one of the ports of the circulator 13 is terminated into a grounded resistor R. This causes the circulator 13 to work as an isolator which will pass signals in only one direction and thus presents a matched impedance to the bandpass filter 11 regardless of the impedance of the circuitry following the circulator. Therefore the circulator 13 prevents the mismatched impedance between the bandpass filter 11 and any other device which might then receive the microwave signal thus freeing the signal from distortion due to phase non-linearity.

Unfortunately, the circulator 13 also acts as a matched resistive noise source to the device immediately following the circulator. The circulator 13 looks to be a noise source and a resistive load at all the frequencies out of the bandpass of the bandpass filter 11. The resistor R which is the terminating resistor for the circulator 13 in FIG. 1 is the source of noise associated with the circulator 13. At frequencies outside the bandpass of the bandpass filter 11 the filter is highly reactive and the noise voltage generated by the resistor R passes through the circulator 13, is reflected off the filter 11 and goes through the circulator 13 a second time to appear at the input of the preamplifier 15. Noise voltages within the bandpass frequencies of bandpass filter 11 pass through the filter and are not reflected. Therefore, the circulator 13 acts as a noise source and a resistive load at the image band of frequencies.

The GaAs FET preamplifier 15 is a low noise amplifier that increases the level of all signals at its input. Recently, GaAs FET's have been used as preamplifiers in microwave applications. Their electrical characteristics provide good performance characteristics at microwave frequencies. In the classic microwave receiver front end design of FIG. 1 both the desired signal passed by the bandpass filter 11 and image frequency noise generated by the circulator 13 will be present at the input of the preamplifier 15. Therefore, the preamplifier 15 will amplify the desired signal and the image frequency noise.

To prevent the image frequency noise from being mixed into the intermediate frequency signal a notch filter 17 receives the output of the preamplifier 15. The notch filter 17 prevents the image frequency noise from going to the mixer and being added to the intermediate frequency and thereby degrading the received signal. The electrical notch of the notch filter 17 must be tuned to the image frequency which is to be notched out.

Once the image frequency has been removed by notch filter 17, the signal goes to a balanced mixer 19. In microwave applications the balanced mixer usually consists of a hybrid combiner and two diodes. This type of mixer is needed to provide isolation between the local oscillator signal and the received RF signal path. This isolation prevents the local oscillator signal from feeding back into the output of the preamplifier 15 and causing distortion. The mixer 19 translates the desired signal from the RF frequency to the intermediate frequency. A low pass filter 21 separates the intermediate frequency signal output of the balanced mixer 19 from the RF signal and local oscillator signal to provide the desired information signal to the remainder of the receiver.

Figure 2:
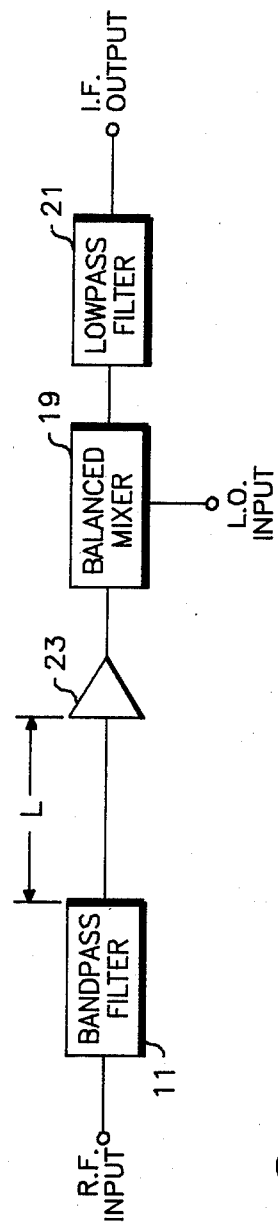
FIG. 2 shows the configuration of a microwave hetrodyne receiver front end according to the invention.

FIG. 2 is a microwave hetrodyne receiver front end design according to the invention. The receiver front end according to the invention eliminates the need for the circulator and the notch filter. This results in substantial cost advantages while simplifying the design of the receiver front end without sacrifice of performance. Those devices in FIG. 2 which are common with the devices of FIG. 1 are designated by the same numeric.

The RF signal is received by a bandpass filter 11 which is required in the receiver front end of the invention for the same reasons it is required for the prior art receiver. The circulator 13 in FIG. 1 is not needed in the receiver front end of FIG. 2 if the preamplifier 23 is a good impedance match for the filter 11. It is well known that preamplifiers are designed for minimum noise figure criteria which often precludes a good impedance match at the desired frequencies. However, methods have been developed in the prior art which use feedback techniques to cause the minimum noise figure and input match conditions to exist simultaneously. By selection of the proper GaAs FET with the correct reverse transfer characteristics and use of the proper load impedance with it, a simultaneously good noise figure and input impedance match can be achieved. Thus, the circulator can be removed since the bandpass filter 11 now has a matched impedance load at the desired frequencies. The circulator is no longer present to act as a resistive noise source and resistive load for the image frequency. Therefore the internal noise source of the GaAs FET and the impedance across the gate become the most important considerations for noise performance. In order to maximize the reduction of noise at the image frequency a critical distance designated as L in FIG. 2 is required between the output of the bandpass filter 11 and the input of the GaAs FET preamplifier 23. The bandpass filter 11 in the configuration shown in FIG. 2 directly influences the preamplifier 23 at the image frequency. The length L defines an interaction between the preamplifier 23 and filter 11 which eliminates the noise at the image frequency noise internally generated in the preamplifier 23 from appearing at the output of the preamplifier 23. The impedance seen by the preamplifier at the image frequency is;

$$Z_{image} = \frac{Z_L \cosh \delta L + Z_o \sinh \delta L}{Z_o \cosh \delta L + Z_L \sinh \delta L}$$

where $\delta = \alpha + j\beta, \beta = 2\pi/\lambda, Z_o$ equals the impedance of the transmission line of length L and $Z_L$ equals the impedance at the output of bandpass filter 11.

If we assume that the transmission line L is a lossless line and also that the bandpass filter 11 is a series of waveguide resonators the formula for impedance at the image frequency becomes;

$$Z_{image} = j Z_o \tan \beta L$$

where L equals the length of the transmission line from the last iris of the filter.

From these formulas it can be easily seen that the impedance at the image frequency is purely reactive and can be selected to have a value from minus infinity to plus infinity by proper selection of the length L for the transmission line. For $Z_{image}$ equal to zero L must be equal to $\eta\pi/\beta$ where $\eta$ is an integer.

In an actual practical application, the GaAs FET package parasitic impedances will distort this equation. The GaAs FET device often has small lengths of conductors (bond wires) from the die to outside connections on the package. These create series inductive and parallel capacitive impedances which require a correction to the length equation so that the $Z_{image} = 0$ appears at the actual gate of the device and not at the lead of the package. The length L is the distance as measured from the closest image frequency zero impedance point of the bandpass filter. As an example, for a bandpass filter designed in waveguide, this would be the location of the last filter iris. It can be seen that for a typical usable band of frequencies the length L must be kept short so that the value of n must be small, usually no more than two or three. The bandpass filter 11 may be designed in one medium such as wave guide and the preamplifier 23 designed another, such as microstrip. The transition between these two mediums has a finite length associated with it. Therefore, the length L cannot be reduced to zero in these types of systems. For receiver front ends where the bandpass filter 11 is designed on the same medium as the preamplifier 23, it may be possible to reduce the length L to zero. As discussed later, the value of length L is selected such as to set the image impedance equal to zero thereby making the noise voltage at the image frequency virtually non-existent.

The preamplifier 23 is a low noise GaAs FET preamplifier with the characteristic of having a input impedance match with the bandpass filter 11 at the desired bandpass frequencies while maintaining good noise specifications. This is achieved using feedback techniques of either parallel or series elements in the preamplifier. Some GaAs FET's currently manufactured have reverse transfer characteristics which can be used with a properly selected load impedance to cause the input impedance to change to an impedance very close to the minimum noise figure (an impedance match at the bandpass frequencies). This design reduces the gain of the preamplifier slightly, but it allows the elimination of the circulator and the signal loss associated with it so that the overall gain effect is beneficial. Therefore, this preamplifier 23 differs from the preamplifier 15 in the prior art front end receiver in FIG. 1 through the use of well known feedback techniques in the preamplifier design.

Since the circulator 13 has been eliminated in the front end receiver design in FIG. 2, and the transmission line length L has been chosen to minimize the image noise generated internally in the preamplifier, there is no longer a noise source or a real part of the source impedance at the image frequency. Therefore, there is no need for a notch filter at the output of the preamplifier if the imaginary part of the source impedance is small. So in FIG. 2, the output of the preamplifier feeds directly into the mixer 19. The balanced mixer 19 in FIG. 2 is identical to the balanced mixer used in the prior art front end shown in FIG. 1. Similarly, the low pass filter 21 in FIG. 2 is the same as the low pass filter 21 in FIG. 1.

The dominant source of noise in a FET is the thermal noise developed within the channel resistance. This thermal noise creates a voltage within the channel which capacitatively couples into the gate of the FET. This noise voltage then causes a drain current fluctuation which appears at the load of the FET as noise. The result is a high correlation between the noise voltage on the gate of the FET and the noise current at the drain. For a GaAs FET the correlation coefficient's magnitude typically approximates 0.95 for a one micron channel width (at microwave frequencies). Since the output noise depends on a noise voltage being developed across the gate, if the noise voltage can be made zero at those frequencies then the noise output at those frequencies can be set to zero. Gate voltage at the image frequency is indicated by the equation below:

$$V_{gate} = V_{channel} \frac{Z_{image}}{Z_{image} + \omega C}$$

where $\omega = 2\pi f$, C=gate to channel capacitance, $Z_{image}$ equals the impedance measured from FET gate to ground and $V_{channel}$ equals the voltage generated within the channel due to thermal noise.

If the circulator was present, as in the prior art $Z_{image}$ would equal the line impedance, $Z_o$ and there would be significant noise voltage at the gate and this would cause significant noise power at the output. However, when the circulator is removed as in this invention, $Z_{image}$ can be made to approximate zero by proper selection of the length L of the transmission line. $Z_{image}$ can be made very small over a large band of frequencies making the image noise at those frequencies virtually non-existant, The preamplifier having high correlation between input and output noise will therefore have low noise output at the image frequency. Since the noise voltage at the image frequency is no longer present, the notch filter can be removed from the receiver front end.

GaAs FETs are presently the only commercially available parts with this characteristic. Silicon FETs have lower noise correlation and so their use in this receiver configuration show some benefit but not really dramatic or attractive results. Bipolar devices have such low correlation of noise between input and out, that they are not usable. Several useful references explain in greater detail in nature in characteristics of GaAs FETS. They are: (1) Wallmark and Johnson, Field Effect Transistors 1966 Prentice-Hall, Inc., Englewood Cliffs; and (2) Hermann Statz, Hermann A. Haus, Robert Pucell "Noise Characteristics of Gallium Arseuide Field Effect Transistors" IEEE Transactions on Electronic Devices Vol. ED-21 Neg Sept. 1974.

I claim:

1. A high frequency heterodyne receiver front end for receiving a communications signal comprising a desired information frequency and an undesired image frequency, said receiver front end comprising;
    a bandpass filter,
    a preamplifier responsive to said bandpass filter,
    a mixer directly receiving the output of said preamplifier,
    coupler means coupling said bandpass filter to said preamplifier, said coupler means comprising a transmission line of a length L equal to $\eta\pi/\beta$ where $\eta$ is an integer and $\beta$ is proportional to the wavelength of the image frequency which defines a reactive short at said undesired image frequency due to the impedance characteristics of said coupler means to thereby eliminate the image frequency noise at the input to said preamplifier.

2. A hetrodyne receiver of claim 1 wherein said preamplifier is a GaAs FET.

3. A method for receiving and processing communications signals comprising a desired frequency signal and an undesired image frequency signal, the method comprising the steps of;
    (a) filtering said desired frequency from said communications signal with a filtering means,
    (b) transmitting said desired frequency over a transmission medium which has a length L equal to $\eta\pi/\beta$ where $\eta$ equals an integer and $\beta$ is proportional to the wavelength of the image frequency,
    (c) low noise amplifying said desired frequency while impedance matching with said transmission medium,
    (d) mixing said desired frequency with a local oscillator frequency to produce an information signal.

* * * * *